US012785288B2

(12) United States Patent
Swift

(10) Patent No.: US 12,785,288 B2
(45) Date of Patent: Nov. 3, 2026

(54) ANTENNA STRUCTURE DESIGN

(71) Applicant: BAE SYSTEMS plc, London (GB)

(72) Inventor: Paul James Swift, Preston (GB)

(73) Assignee: BAE SYSTEMS PLC, London (GB)

( * ) Notice: Subject to any disclaimer, the term of this patent is extended or adjusted under 35 U.S.C. 154(b) by 182 days.

(21) Appl. No.: 18/690,922

(22) PCT Filed: Aug. 9, 2022

(86) PCT No.: PCT/GB2022/052066
§ 371 (c)(1),
(2) Date: Mar. 11, 2024

(87) PCT Pub. No.: WO2023/037090
PCT Pub. Date: Mar. 16, 2023

(65) Prior Publication Data

US 2024/0396225 A1 Nov. 28, 2024

(30) Foreign Application Priority Data

Sep. 10, 2021 (GB) ..................................... 2113026

(51) Int. Cl.
*H01Q 17/00* (2006.01)
*H01Q 1/42* (2006.01)

(52) U.S. Cl.
CPC ............. *H01Q 17/001* (2013.01); *H01Q 1/42* (2013.01)

(58) Field of Classification Search
CPC ........ H01Q 17/001; H01Q 1/42; H01Q 1/281; H01Q 21/061; H01Q 21/00; H01Q 1/28; H01Q 21/06; G06F 30/23; G06F 30/20
See application file for complete search history.

(56) References Cited

U.S. PATENT DOCUMENTS

| | | | | |
|---|---|---|---|---|
| 5,371,505 A * | 12/1994 | Michaels | H01Q 1/42 324/639 |
| 11,366,151 B2 * | 6/2022 | Liu | G01R 29/10 |
| 2019/0339318 A1 | 11/2019 | Liu et al. | |

FOREIGN PATENT DOCUMENTS

| | | | |
|---|---|---|---|
| CN | 105388449 A * | 3/2016 | G01S 3/48 |
| CN | 109408967 A * | 3/2019 | G06F 30/20 |

(Continued)

OTHER PUBLICATIONS

CN_109408967_A_I_translate.pdf (Year: 2019).*

(Continued)

*Primary Examiner* — Yonghong Li
(74) *Attorney, Agent, or Firm* — Scully, Scott, Murphy & Presser, P.C.

(57) ABSTRACT

A method for generating a measure for insertion loss of an antenna structure comprising a radome defining a cavity to receive an antenna array. The method may comprise partitioning a user define geometry, which includes shape and dimensions, of the radome into a mesh comprising a first set of discrete geometric and topological cells, determining, for each cell, angles of incidence of electromagnetic radiation emitted from respective antenna elements of the antenna array for each scan angle of interest, the angles of incidence of electromagnetic radiation for a cell defining a distribution for that cell, on the basis of the distribution for a cell, assigning each cell to a zone of a set of zones for the radome, generating a measure of the insertion loss for each zone, and using the corresponding measure of insertion loss for a zone, selecting a structural configuration for the zone.

20 Claims, 4 Drawing Sheets

(56) References Cited

FOREIGN PATENT DOCUMENTS

| | | | |
|---|---|---|---|
| CN | 109726439 | A | 5/2019 |
| CN | 106654566 | B | 11/2019 |

OTHER PUBLICATIONS

CN_105388449_A_I_translate.pdf (Year: 2016).*
International Search Report dated Oct. 24, 2022 issued in PCT/GB2022/052066.
GB Search Report dated Mar. 29, 2022 issued in GB 2113026.5.
Lu, Cai-Cheng, "A Fast Algorithm Based on vol. Integral Equation for Analysis of Arbitrarily Shaped Dielectric Radomes", IEEE Transactions on Antennas and Propagation (Mar. 2003), vol. 51, No. 3, pp. 606-612.

* cited by examiner

ANTENNA STRUCTURE DESIGN

FIELD

The present invention relates to antenna structures, and more specifically, although not exclusively to the design and evaluation of antenna structures comprising antenna arrays and radome design.

BACKGROUND

Radar systems generally comprise an antenna array housed behind or within an antenna cover or radome that is designed to provide protection to the antenna array from environmental and/or situational conditions. For example, a platform such as an aircraft can utilise streamlined radomes over scanning radar antennas for both environmental protection and to aerodynamic stability.

Radomes must provide a certain level of electrical performance in addition to satisfying the mechanical and physical requirements of the prevailing radar application. Broadly speaking, this involves an iterative process in which the material and shape that have been specified from environmental and platform stability requirements are modified in view of the underlying requirements for radar performance. The aim will generally be to provide a radome with low attenuation of the radar signal, and which provokes a small change in the apparent angle-of-arrival.

Generally, the design of radar structures comprising antenna arrays and radomes is a time consuming and complex process due to the interplay between the various parts of the system. Although some aspects can be automated, initial designs, evaluation and modifications are typically carried out with the intervention of skilled engineers using specifically developed applications that require long run-times in order to arrive at solutions.

SUMMARY

According to a first aspect of the present disclosure, there is provided a non-transitory machine-readable storage medium encoded with instructions for generating a measure for insertion loss of an antenna structure comprising a radome defining a cavity to receive an antenna array, the instructions executable by a processor of a system whereby to cause the system to receive a first input comprising a first set of parameters defining a number and relative position of antenna elements for the antenna array whereby to define a geometry for the antenna array, the geometry comprising an array shape and dimensions, receive a second input comprising a second set of parameters defining a geometry of the radome, the geometry comprising a radome shape and dimensions, partition the geometry of the radome into a mesh comprising a first set of discrete geometric and topological cells, determine, for each cell in the first set of discrete geometric and topological cells, angles of incidence of electromagnetic radiation emitted from respective antenna elements of the antenna array for each scan angle of interest, the angles of incidence of electromagnetic radiation for a cell defining a distribution for that cell, on the basis of the distribution for a cell, assign each cell to a zone of a set of zones for the radome, generate a measure of the insertion loss for each zone, and using the corresponding measure of insertion loss for a zone, select a structural configuration for the zone.

In an implementation of the first aspect, the non-transitory machine-readable storage medium can further comprise instructions to generate data representing a first order flash lobe pattern for the antenna structure. The storage medium can further comprise instructions to generate data representing a grating lobe pattern for the antenna array using the first set of parameters, and using the grating lobe pattern, calculate a measure of a radiation pattern incident on the radome by determining locations of a main lobe and grating lobes of the grating lobe pattern. The storage medium can further comprise instructions to receive data representing a set of requirement definitions for the antenna structure comprising a range of frequencies for transmission and reflection of signals from the radome and aspect information defining one or more of a range of elevation and azimuth angles within which the range of frequencies for transmission and reflection of signals are to be adhered to. The storage medium can further comprise instructions to assign a material to a wall build of a zone, and calculate a measure for insertion loss for a flat panel sample of the zone on the basis of the assigned wall build.

According to a second aspect of the present disclosure, there is provided a method for generating a measure for insertion loss of an antenna structure comprising a radome defining a cavity to receive an antenna array, the method comprising receiving a first input comprising a first set of parameters defining a number and relative position of antenna elements for the antenna array whereby to define a geometry for the antenna array, the geometry comprising an array shape and dimensions, receiving a second input comprising a second set of parameters defining a geometry of the radome, the geometry comprising a radome shape and dimensions, partitioning the geometry of the radome into a mesh comprising a first set of discrete geometric and topological cells, determining, for each cell in the first set of discrete geometric and topological cells, angles of incidence of electromagnetic radiation emitted from respective antenna elements of the antenna array, the angles of incidence of electromagnetic radiation for a cell defining a distribution for that cell, on the basis of the distribution for a cell, assigning each cell to a zone of a set of zones for the radome, generating a measure of the insertion loss for each zone, and using the corresponding measure of insertion loss for a zone, selecting a structural configuration for the zone insertion loss.

In an implementation of the second aspect, the method can further comprise generating data representing a first order flash lobe pattern for the antenna structure. The method can further comprise generating data representing a grating lobe pattern for the antenna array using the first set of parameters, and using the grating lobe pattern, calculating a measure of a radiation pattern incident on the radome by determining locations of a main lobe and grating lobes of the grating lobe pattern. The method can further comprise receiving data representing a set of requirement definitions for the antenna structure comprising a range of frequencies for transmission and reflection of signals from the radome and aspect information defining one or more of a range of elevation and azimuth angles within which the range of frequencies for transmission and reflection of signals are to be adhered to. The method can further comprising assigning a material to a zone, and calculating a measure for insertion loss for the zone on the basis of the assigned material.

According to an third aspect of the present disclosure, there is provided an apparatus for generating a measure for insertion loss of an antenna structure comprising a radome defining a cavity to receive an antenna array, the apparatus configured to receive a first input comprising a first set of parameters defining a number and relative position of antenna elements for the antenna array whereby to define a geometry for the antenna array, the geometry comprising an array shape and dimensions, receive a second input comprising a second set of parameters defining a geometry of the radome, the geometry comprising a radome shape and dimensions, partition the geometry of the radome into a mesh comprising a first set of discrete geometric and topological cells, determine, for each cell in the first set of discrete geometric and topological cells, angles of incidence of electromagnetic radiation emitted from respective antenna elements of the antenna array, the angles of incidence of electromagnetic radiation for a cell defining a distribution for that cell, on the basis of the distribution for a cell, assign each cell to a zone of a set of zones for the radome, generate a measure of the insertion loss for each zone, and using the corresponding measure of insertion loss for a zone, select a structural configuration for the zone.

BRIEF DESCRIPTION OF THE FIGURES

Embodiments of the invention will now be described by way of example only with reference to the figures, in which.

DETAILED DESCRIPTION

Figure 1:
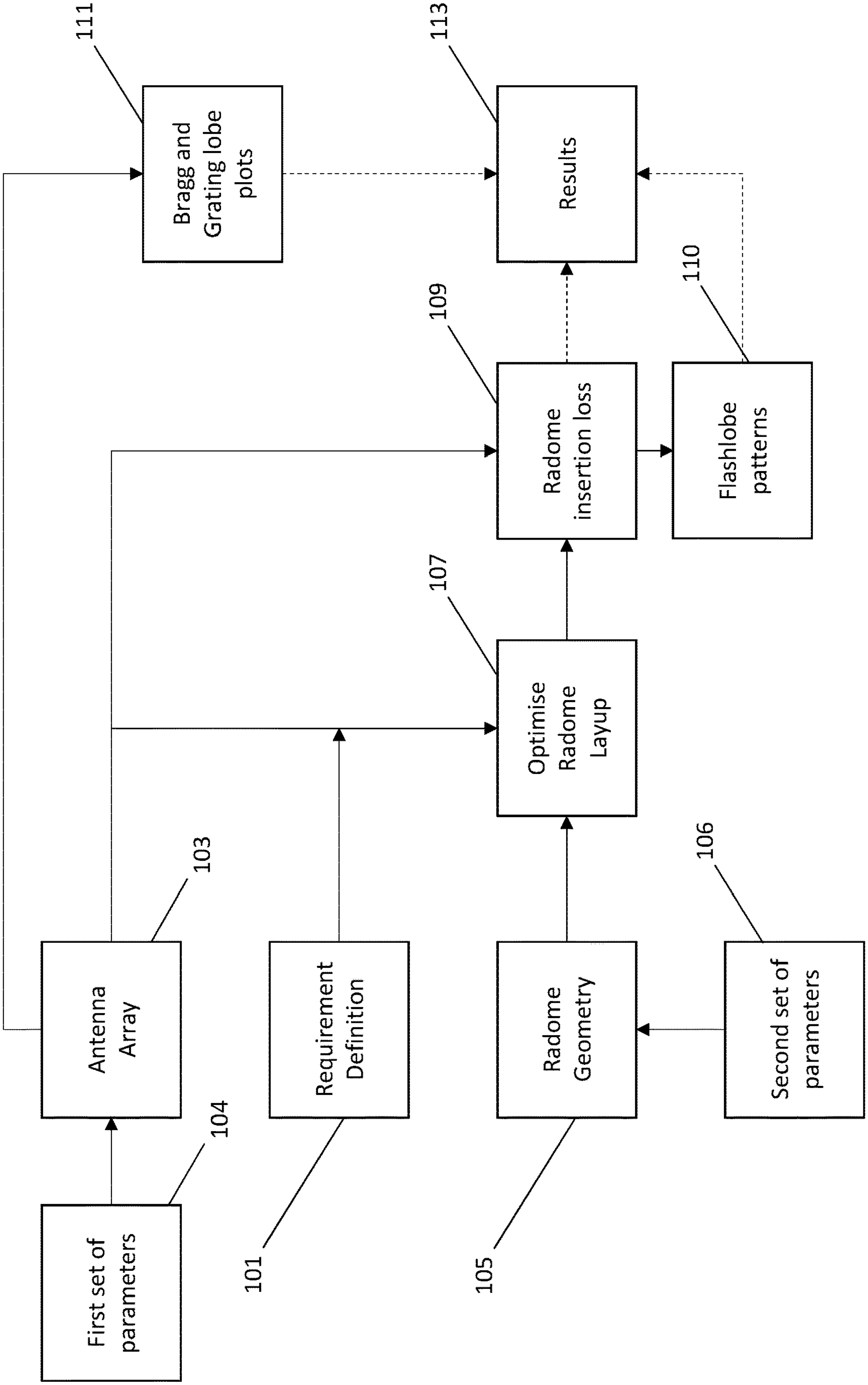
FIG. 1 is a flowchart of a method according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Antenna structures comprising antenna arrays housed or other provided within radomes are usually designed on the basis of a compromise between the desired electrical and structural properties of the structure. For structural reasons, radomes are required both in airborne radar where the aerodynamic shape of the aircraft is important and in ground-based radar where the antenna array must be protected against weather and wind loading. For ideal electrical performance the beam of the radar antenna should be entirely unaffected by the radome. The design and evaluation of an antenna structure can take months to perform, often involving a team of skilled engineers in which an iterative process between initial and final designs for both antenna arrays and radomes is undertaken in order to meet both electrical and structural metrics. For concept development, the long timeframes associated with design an a evaluation can be problematic, often leaving engineers to use their best judgement in the designs of antenna structures.

According to an example, there is provided a method for the design and analysis of antenna structures comprising antenna arrays and radome designs. The method reduces the time taken for design and analysis of installed antenna structures, enabling design choices to be updated rapidly in response to results, such as measures of insertion loss. For example, a radome will reflect some power and absorb some power. The reflection and absorption result in transmission loss, or insertion loss, or loss of gain.

FIG. 1 is a flowchart of a method according to an example. In block 101 a requirement definition for an antenna structure is provided. In an example, a requirement definition 101 can comprise data defining objective functions for the optimization of, e.g., the walls of a radome. For example, a set of frequency ranges over which a radome is required to transmit and reflect signals and/or aspects (combinations of, e.g., elevation and azimuthal angles) for which the performance requirements are most stringent can be defined. In block 104 a first set of parameters is provided defining a number and relative position of antenna elements for the antenna array, thereby defining a geometry for an antenna array 103. In block 106 a second set of parameters defining a geometry of a radome 105 can be provided, the geometry comprising a radome shape and dimensions.

On the basis of the first set of parameters, a representation of the antenna array 103 can be generated. In an example, the representation can be presented to a user using a display device of an apparatus, which can be configured to receive user input for modifying the representation of the antenna array 103. For example, a user can provide the first set of parameters to a computing apparatus comprising a display and input device. A representation of the antenna apparatus can be generated or rendered using the first set of parameters, and the representation can be modified, either by way of adjustment of the first set of parameters and/or using the input device to change aspects of the representation of the antenna array in real time. For the example, at least one of the size, shape, number of antenna elements and relative position of antenna elements of the antenna array can be modified.

In block 107, the geometry of the antenna array 103 and/or the requirement definition 101 can be used to optimize a layup or wall build for the radome geometry 105. That is, for example, one or more materials and/or composite structures can be selected for the radome and/or parts thereof. Different regions of the radome may comprise different materials and/or composite structures.

In an example, the radome geometry can be modified to ensure that the antenna array 103 is suitably housed and that no antenna elements are covered or outside of the radome itself. In block 109, a measure for the insertion loss of the radome is calculated, which can be used to generate a measure of flash lobes 110. In block 111, data representing Bragg and grating lobes for the antenna structure are calculated. The insertion loss of the radome from block 109, and the data from blocks 110 and 111 provides a set of results 113 that can be used to evaluate the antenna structure. In an example, the requirement definition 101 can be used to evaluate the performance of the antenna structure comprising the antenna array 103 and radome combination.

Figure 2:
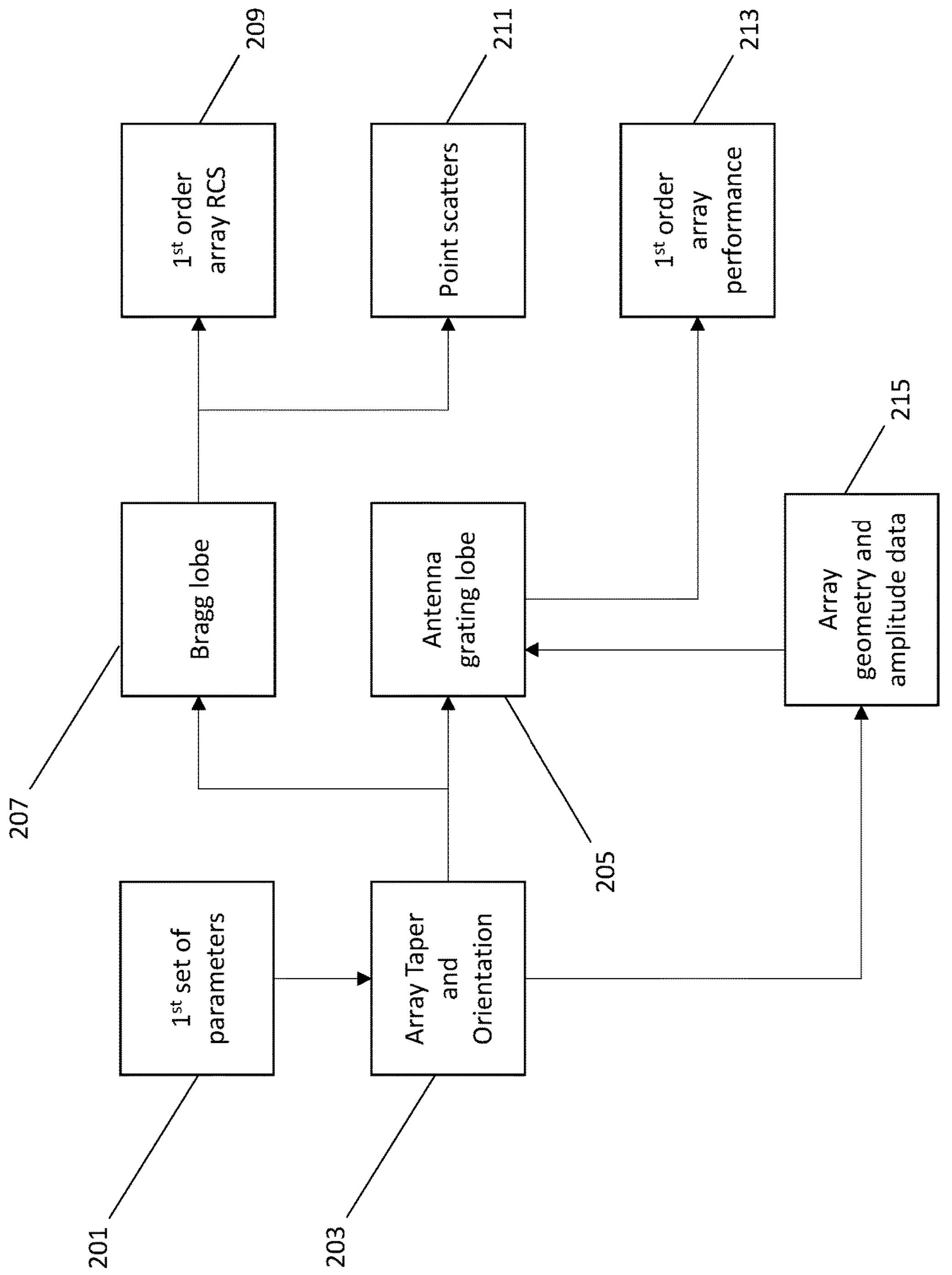
FIG. 2 is flowchart of a method for generation of an antenna array according to an example.

FIG. 2 is flowchart of a method for generation of an antenna array according to an example. A first set of parameters 201, as described above, is used to define an antenna array, including an array shape and dimensions, a periodic (or irregular) grid for antenna elements. The parameters 201 are used to define an array amplitude taper and orientation in block 203. For example, the orientation and position of the antenna array can be defined as well as the tapering of the amplitude of the elements of the antenna array to provide data representing an array geometry and amplitude in block 215. In blocks 205 and 207, the geometric characteristics of the antenna array, defining the relative position of antenna elements for example, is used to calculate data representing Bragg lobes and antenna grating lobes. The antenna grating lobe data in block 205 can be used to determine a first order array performance in block 213, whilst the Bragg lobe data can be used to determine a first order array radar cross section in block 209 and data representing point scatterers in block 211 for use with other tools.

Figure 3:
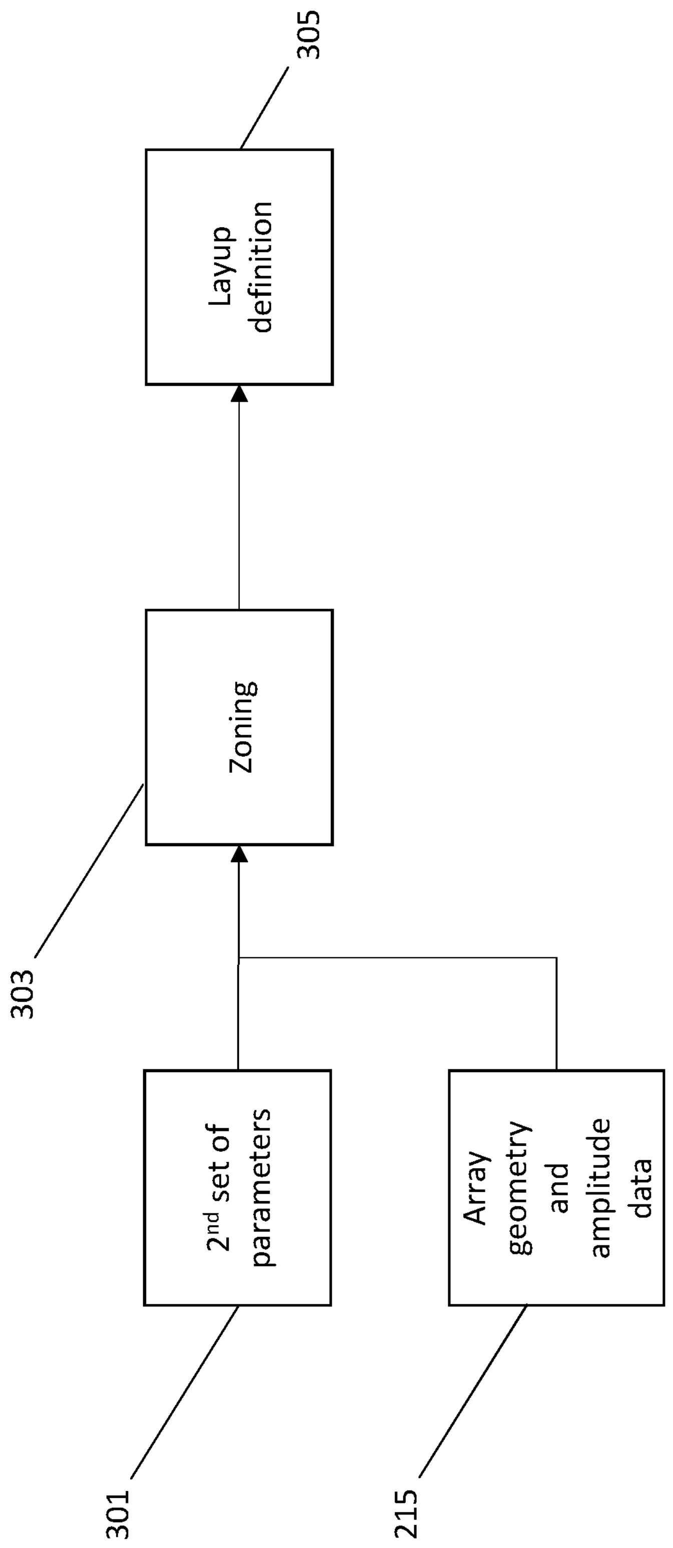
FIG. 3 is flowchart of a method for generation of a radome according to an example.

FIG. 3 is flowchart of a method for generation of a radome according to an example. The second set of parameters 301, defining the geometric characteristics of the radome, is provided, e.g., by a user according to a desired size and shape of a radome. An array geometry and amplitude from block 215 is used, along with the radome geometry, to determine a set of zones for the radome in block 303. In an example, the geometry of the radome is partitioned into a mesh comprising a first set of discrete geometric and topological cells. In an example, a radome may be partitioned in multiple meshes, each comprising a different number and/or arrangement of cells. According to an example, for each cell in the first set of discrete geometric and topological cells, angles of incidence of electromagnetic radiation emitted from respective antenna elements of the antenna array are determined. The angles of incidence of electromagnetic radiation for a cell define a distribution for that cell. That is, for cell of a radome mesh, the angle of incidence of a signal emitted from an element of the antenna array is determined. This provides, for each cell, multiple such angles of incidence over the elements of the antenna array. These angles of incidence form a distribution for the cell in question. On the basis of the distribution for a cell, each cell can be assigned to a zone of a set of zones for the radome.

In an example, cells may be assigned to the zones in one of two ways. In one example, a radome can be 'sliced' or partitioned vertically into sections. Cells can then be assigned to zones based on which of these slices they fall into. In another example, the distribution of incidence angles that each cell will experience (based on the required range of antenna scan angles) can be calculated. An optimiser can then be used to assign the cells to the zones (of which there is a predefined number). According to an example, an objective of the optimiser is to minimise the standard deviation of the distribution of incidence angles in each zone (i.e., the combination of the distributions for each cell in a given zone). An initial assignment provided to the optimiser can have cells assigned by, e.g., their median incidence angle (i.e., a first zone can comprise cells with medians between 0° and 10°, a second zone can comprise cells with medians between 10° and 20°, and so-on) as this provides a reasonable approximation to an optimum. At the end of the optimization, the maximum incidence angle of one zone may be less than the minimum of another zone. However, it is the standard deviation that is key, not the range.

For ogival radomes the first method is often a reasonable approximation to the result from the second method. Following zone assignment, regions of a radome may be separated out into additional zones for structural reasons. For example, cells within a small (specified) distance of the nose tip may be assigned to a new zone (ignoring their previous assignment, even if it was made by the optimiser), whose wall build may then be defined according to structural rather than electromagnetic requirements.

In block 305 a wall build definition for the radome can be determined. In an example, the insertion loss for each zone can be calculated on the basis of, e.g., a default material from which the radome can be constructed, such as a dielectric material or another material or composite structure. For example, a zone can be configured to comprise, e.g., a half wave monolithic or optimized C-sandwich material, or even a frequency selective surface and so on. A choice of material for each zone can be modified. A measure of insertion loss for a zone can be determined using a selected structural configuration comprising, e.g., the selected or modified material or composite structure.

Accordingly, a radome can be split into multiple zones, each of which can have a different wall build. In this way, it is possible for each zone to have a narrower distribution of incidence angles than the radome as a whole.

The present disclosure is described with reference to flow charts and/or block diagrams of the method, devices, apparatus and systems according to examples of the present disclosure. Although flow diagrams described may show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a machine such as a general-purpose computer, user equipment such as a smart device, e.g., a smart phone, a special purpose computer, an embedded processor or processors of other programmable data processing devices to realize the functions described in the description and diagrams. In particular, a processor or processing apparatus may execute the machine-readable instructions. Thus, modules of apparatus (for example, a module implementing a controller) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

Figure 4:
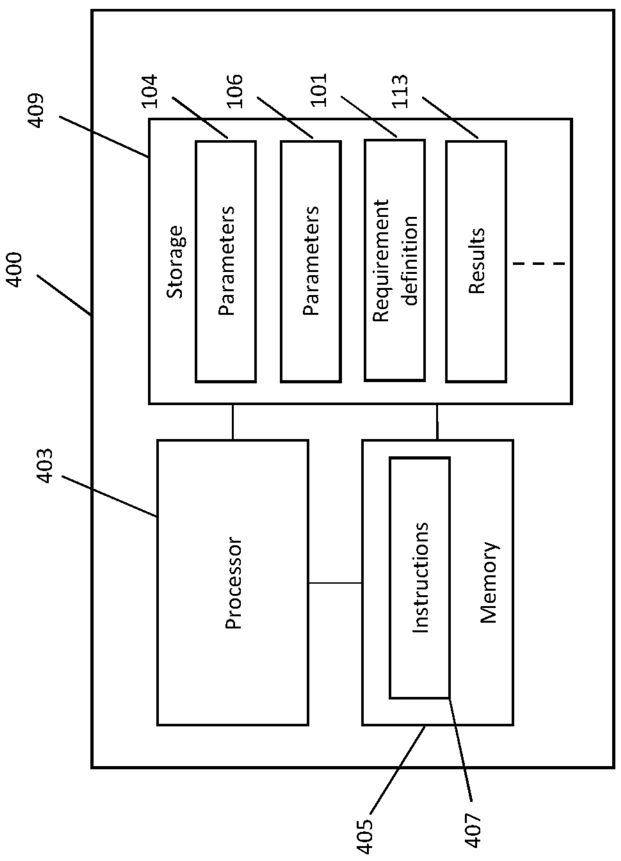
FIG. 4 is a schematic representation of an apparatus according to an example.

FIG. 4 is a schematic representation of an apparatus according to an example. In the example of FIG. 4, apparatus 400 comprises a processor 403, and a memory 405 to store instructions 407, executable by the processor 403.

The apparatus 400 can comprise a storage 409 that can be used to store data such as at least one of a first set of parameters, a second set of parameters, a requirement definition, user input, material information, zone information, cell to zone mappings, and insertion loss measurements and so on. The instructions 407, executable by the processor 403, can cause the apparatus 400 to generate a measure for insertion loss of an antenna structure comprising a radome defining a cavity to receive an antenna array. Accordingly, the apparatus 400 can implement a method as described above.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer or software product, such as a non-transitory machine-readable storage medium, the computer software or product being stored in a storage medium and comprising a plurality of instructions, e.g., machine readable instructions, for making a computer device implement the methods recited in the examples of the present disclosure.

In some examples, some methods can be performed in a cloud-computing or network-based environment. Cloud-computing environments may provide various services and applications via the Internet. These cloud-based services (e.g., software as a service, platform as a service, infrastructure as a service, etc.) may be accessible through a web browser or other remote interface of the user equipment 300 for example. Various functions described herein may be provided through a remote desktop environment or any other cloud-based computing environment.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein. In addition, one or more of the modules described herein may transform data, physical devices, and/or representations of physical devices from one form to another.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The invention claimed is:

1. A non-transitory machine-readable storage medium encoded with instructions for generating a measure for insertion loss of an antenna structure comprising a radome defining a cavity to receive an antenna array, the instructions executable by a processor of a system whereby to cause the system to:

receive a first input comprising a first set of parameters defining a number and relative position of antenna elements for the antenna array whereby to define a geometry for the antenna array, the geometry for the antenna array comprising an array shape and dimensions for the antenna array;

receive a second input comprising a second set of parameters defining a geometry of the radome, the geometry of the radome comprising a radome shape and dimensions of the radome;

partition the geometry of the radome into a mesh comprising a first set of discrete geometric and topological cells;

determine, for each cell in the first set of discrete geometric and topological cells, angles of incidence of electromagnetic radiation emitted from respective antenna elements of the antenna array for each scan angle of interest, the angles of incidence of the electromagnetic radiation for a respective cell in the first set of discrete geometric and topological cells, defining a distribution for said respective cell in the first set of discrete geometric and topological cells;

on the basis of the distribution defined for each cell in the first set of discrete geometric and topological cells, assign each cell in the first set of discrete geometric and topological cells to a zone of a set of zones for the radome;

generate a measure of the insertion loss for each zone of the set of zones for the radome, respectively; and using the corresponding measure of the insertion loss for a respective zone of the set of zones for the radome, select a structural configuration for the respective zone, for each respective zone of the set of zones for the radome.

2. The non-transitory machine-readable storage medium as claimed in claim 1, wherein the instructions further cause, when executed by the processor, the system to generate data representing a first order flash lobe pattern for the antenna structure.

3. The non-transitory machine-readable storage medium as claimed in claim 2, wherein the instructions further cause, when executed by the processor, the system to:

generate data representing a grating lobe pattern for the antenna array using the first set of parameters; and using the grating lobe pattern, calculate a measure of a radiation pattern incident on the radome by determining locations of a main lobe and grating lobes of the grating lobe pattern.

4. A non-transitory machine-readable storage medium as claimed in claim 2, wherein the instructions further cause, when executed by the processor, the system to:

receive data representing a set of requirement definitions for the antenna structure comprising a range of frequencies for transmission and reflection of signals from the radome and aspect information defining one or more of a range of elevation and azimuth angles within which the range of frequencies for transmission and reflection of signals are to be adhered to.

5. The non-transitory machine-readable storage medium as claimed in claim 2, wherein the selecting the structural configuration includes assigning a material to a wall build of each respective zone of the set of zones for the radome; and the generating the measure of the insertion loss includes calculating a measure for the insertion loss for a flat panel sample of each respective zone of the set of zones for the radome on the basis of the assigned material.

6. The non-transitory machine-readable storage medium as claimed in claim 1, wherein the instructions further cause, when executed by the processor, the system to:

generate data representing a grating lobe pattern for the antenna array using the first set of parameters;

using the grating lobe pattern, calculate a measure of a radiation pattern incident on the radome by determining locations of a main lobe and grating lobes of the grating lobe pattern.

7. The non-transitory machine-readable storage medium as claimed in claim 6, wherein the instructions further cause, when executed by the processor, the system to:

receive data representing a set of requirement definitions for the antenna structure comprising a range of frequencies for transmission and reflection of signals from the radome and aspect information defining one or more of a range of elevation and azimuth angles within which the range of frequencies for transmission and reflection of signals are to be adhered to.

8. The non-transitory machine-readable storage medium as claimed in claim 6, wherein the selecting the structural configuration includes assigning a material to a wall build of each respective zone of the set of zones for the radome; and the generating the measure of the insertion loss including calculating a measure for the insertion loss for a flat panel sample of each respective zone of the set of zones for the radome on the basis of the assigned material.

9. The non-transitory machine-readable storage medium as claimed in claim 1, wherein the instructions further cause, when executed by the processor, the system to:

receive data representing a set of requirement definitions for the antenna structure comprising a range of frequencies for transmission and reflection of signals from the radome and aspect information defining one or more of a range of elevation and azimuth angles within which the range of frequencies for transmission and reflection of signals are to be adhered to.

10. The non-transitory machine-readable storage medium as claimed in claim 9, wherein the selecting of the structural configuration includes assigning a material to a wall build of each respective zone of the set of zones for the radome; and the generating of the insertion loss including calculating a measure for the insertion loss for a flat panel sample of each respective zone of the set of zones for the radome on the basis of the assigned material.

11. The non-transitory machine-readable storage medium as claimed in claim 1, wherein the selecting of the structural configuration includes assigning a material to a wall build of each respective zone of the set of zones for the radome and the generating the measure of the insertion loss includes calculating a measure for the insertion loss for a flat panel sample of each respective zone of the set of zones for the radome on the basis of the assigned material.

12. A method for generating a measure for insertion loss of an antenna structure comprising a radome defining a cavity to receive an antenna array, the method comprising:

receiving a first input comprising a first set of parameters defining a number and relative position of antenna elements for the antenna array whereby to define a geometry for the antenna array, the geometry for the antenna array comprising an array shape and dimensions for the antenna array;

receiving a second input comprising a second set of parameters defining a geometry of the radome, the geometry of the radome comprising a radome shape and dimensions of the radome;

partitioning the geometry of the radome into a mesh comprising a first set of discrete geometric and topological cells;

determining, for each cell in the first set of discrete geometric and topological cells, angles of incidence of electromagnetic radiation emitted from respective antenna elements of the antenna array, the angles of incidence of the electromagnetic radiation for a respective cell in the first set of discrete geometric and topological cells defining a distribution for said respective cell in the first set of discrete geometric and topological cells;

on the basis of the distribution for defined for each cell in the first set of discrete geometric and topological cells, assigning each cell in the first set of discrete geometric and topological cells to a zone of a set of zones for the radome;

generating a measure of the insertion loss for each zone of the set of zones for the radome, respectively; and using the corresponding measure of the insertion loss for a respective zone of the set of zones for the radome, selecting a structural configuration for the respective zone, for each respective zone of the set of zones for the radome.

13. The method as claimed in claim 12, further comprising:

generating data representing a first order flash lobe pattern for the antenna structure.

14. The method as claimed in claim 13, further comprising:

generating data representing a grating lobe pattern for the antenna array using the first set of parameters;

using the grating lobe pattern, calculating a measure of a radiation pattern incident on the radome by determining locations of a main lobe and grating lobes of the grating lobe pattern.

15. The method as claimed in claim 13, further comprising:

receiving data representing a set of requirement definitions for the antenna structure comprising a range of frequencies for transmission and reflection of signals from the radome and aspect information defining one or more of a range of elevation and azimuth angles within which the range of frequencies for transmission and reflection of signals are to be adhered to.

16. The method as claimed in claim 12, further comprising:

generating data representing a grating lobe pattern for the antenna array using the first set of parameters;

using the grating lobe pattern, calculating a measure of a radiation pattern incident on the radome by determining locations of a main lobe and grating lobes of the grating lobe pattern.

17. The method as claimed in claim 16, further comprising:

receiving data representing a set of requirement definitions for the antenna structure comprising a range of frequencies for transmission and reflection of signals from the radome and aspect information defining one or more of a range of elevation and azimuth angles within which the range of frequencies for transmission and reflection of signals are to be adhered to.

18. The method as claimed in claim 12, further comprising:

receiving data representing a set of requirement definitions for the antenna structure comprising a range of frequencies for transmission and reflection of signals from the radome and aspect information defining one or more of a range of elevation and azimuth angles within which the range of frequencies for transmission and reflection of signals are to be adhered to.

19. The method as claimed in claim 12, wherein the selecting the structural configuration includes assigning a material to each respective zone of the set of zones for the radome; and the generating the measure of the insertion loss includes calculating a measure for the insertion loss for each respective zone of the set of zones for the radome on the basis of the assigned material.

20. An apparatus for generating a measure for insertion loss of an antenna structure comprising a radome defining a cavity to receive an antenna array, the apparatus comprising:

an interface configured to:

receive a first input comprising a first set of parameters defining a number and relative position of antenna elements for the antenna array whereby to define a geometry for the antenna array, the geometry for the antenna array comprising an array shape and dimensions for the antenna array; and receive a second input comprising a second set of parameters defining a geometry of the radome, the geometry of the radome comprising a radome shape and dimensions of the radome;

a storage configured to store the first set of parameters and the second set of parameters; and a processor configured to:

partition the geometry of the radome into a mesh comprising a first set of discrete geometric and topological cells;

determine, for each cell in the first set of discrete geometric and topological cells, angles of incidence of electromagnetic radiation emitted from respective antenna elements of the antenna array, the angles of incidence of the electromagnetic radiation for a respective cell in the first set of discrete geometric and topological cells, defining a distribution for said respective cell in the first set of discrete geometric and topological cells;

on the basis of the distribution defined for each cell in the first set of discrete geometric and topological cells, assign each cell in the first set of discrete geometric and topological cells to a zone of a set of zones for the radome;

generate a measure of the insertion loss for each zone of the set of zones for the radome, respectively; and using the corresponding measure of the insertion loss for a respective zone of the set of zones for the radome, select a structural configuration for the respective zone, for each respective zone of the set of zones for the radome.

* * * * *